US012614469B2

(12) United States Patent
Nehrenz et al.

(10) Patent No.: US 12,614,469 B2
(45) Date of Patent: Apr. 28, 2026

(54) SYSTEM AND METHOD TO ANALYZE COMPLIANCE OF DETECT AND AVOID

(71) Applicant: Reliable Robotics Corporation, Mountain View, CA (US)

(72) Inventors: Matthew Thomas Nehrenz, Campbell, CA (US); Michael David Bills, Mountlake Terrace, WA (US)

(73) Assignee: Reliable Robotics Corporation, Mountain View, CA (US)

( * ) Notice: Subject to any disclaimer, the term of this patent is extended or adjusted under 35 U.S.C. 154(b) by 513 days.

(21) Appl. No.: 17/975,276

(22) Filed: Oct. 27, 2022

(65) Prior Publication Data

US 2023/0134955 A1 May 4, 2023

Related U.S. Application Data

(60) Provisional application No. 63/273,747, filed on Oct. 29, 2021.

(51) Int. Cl.
| | |
|---|---|
| *G08G 5/80* | (2025.01) |
| *G06Q 30/018* | (2023.01) |
| *G07C 5/00* | (2006.01) |
| *G08G 5/20* | (2025.01) |

(52) U.S. Cl.
CPC ............. *G08G 5/80* (2025.01); *G06Q 30/018* (2013.01); *G07C 5/008* (2013.01); *G08G 5/20* (2025.01)

(58) Field of Classification Search
CPC ...... G08G 5/04; G08G 5/0017; G06Q 30/018; G07C 5/008
See application file for complete search history.

(56) References Cited

U.S. PATENT DOCUMENTS

| | | | | |
|---|---|---|---|---|
| 5,549,477 | A | * | 8/1996 | Tran ........................ G01S 7/021 |
| | | | | 342/13 |
| 2007/0106473 | A1 | | 5/2007 | Bodin et al. |
| 2009/0177614 | A1 | | 7/2009 | Angell et al. |
| 2010/0228468 | A1 | | 9/2010 | D'Angelo |
| 2011/0264312 | A1 | | 10/2011 | Spinelli et al. |
| 2012/0218127 | A1 | | 8/2012 | Kroen |
| 2018/0155052 | A1 | | 6/2018 | Lacroix et al. |
| 2019/0054937 | A1 | * | 2/2019 | Graetz ................. G08G 5/0039 |
| 2020/0111375 | A1 | * | 4/2020 | Garden ................... G08G 5/26 |
| 2020/0258405 | A1 | * | 8/2020 | Fern ..................... G08G 5/0039 |
| 2021/0043104 | A1 | * | 2/2021 | Hadfield ................ G09B 9/302 |

OTHER PUBLICATIONS

The International Searching Authority, "Search Report and Written Opinion" in applicaiton No. PCT/US2022/078829, Apr. 6, 2023, 18 pages.
Santiago et al., "Pilot Evaluation of a UAS Detect-and-Avoid System's Effectiveness in Remaining Well Clear", NASA UAS-NAS Project Deliverable—Part Task 4 and iHitL Test Setup 2 Simulation Results, 2014, Retrieved on Febraury 6, 2023 from https://ntrs.nasa.gov/citations/20190025388, 17 pages.

* cited by examiner

*Primary Examiner* — Steven Vu Nguyen
(74) *Attorney, Agent, or Firm* — Davis Wright Tremaine LLP

(57) ABSTRACT

Apparatuses, systems, and techniques to perform and facilitate flight system compliance analysis. In at least one embodiment, one or more processors and/or computing systems compute one or more metrics to model and analyze performance of one or more aircraft systems with respect to one or more safety requirements.

20 Claims, 5 Drawing Sheets

400

GENERATE TRAJECTORY DATA — 402

GENERATE ENCOUNTER DATA — 404

GENERATE SENSOR MODEL DATA — 406

GENERATE AIRCRAFT MODEL DATA — 408

APPLY AVOIDANCE GUIDANCE ALGORITHM — 410

APPLY REMOTE PILOT RESPONSE — 412

CALCULATE $P(NMAC|enc)$ — 414

CALCULATE NMAC Rate — 416

SYSTEM AND METHOD TO ANALYZE COMPLIANCE OF DETECT AND AVOID

CLAIM OF PRIORITY

This application claims the benefit of U.S. Provisional Application No. 63/273,747 titled "METHOD FOR ANALYZING DETECT AND AVOID COMPLIANCE," filed Oct. 29, 2021, the entire contents of which is incorporated herein by reference.

TECHNICAL FIELD

At least one embodiment pertains to processing resources used to perform and facilitate flight system compliance analysis. For example, at least one embodiment pertains to processors and/or computing systems used to compute one or more metrics to analyze performance of one or more aircraft systems with respect to one or more safety requirements according to various novel techniques described herein.

BACKGROUND

Flight systems have traditionally utilized various computing devices to assist pilots in flight operations. To ensure minimum safety requirements are met by these computing devices and flight systems, various governmental authorities have adapted standards, often codified in regulations and enforced by said governmental authority. As technology improves, these flight systems must continue to meet strict safety requirements. This is especially true as flight systems improve automated flight capabilities. Such systems must demonstrably meet strict safety standards.

BRIEF DESCRIPTION OF THE DRAWINGS

Various techniques will be described with reference to the drawings, in which.

DETAILED DESCRIPTION

Figure 1:
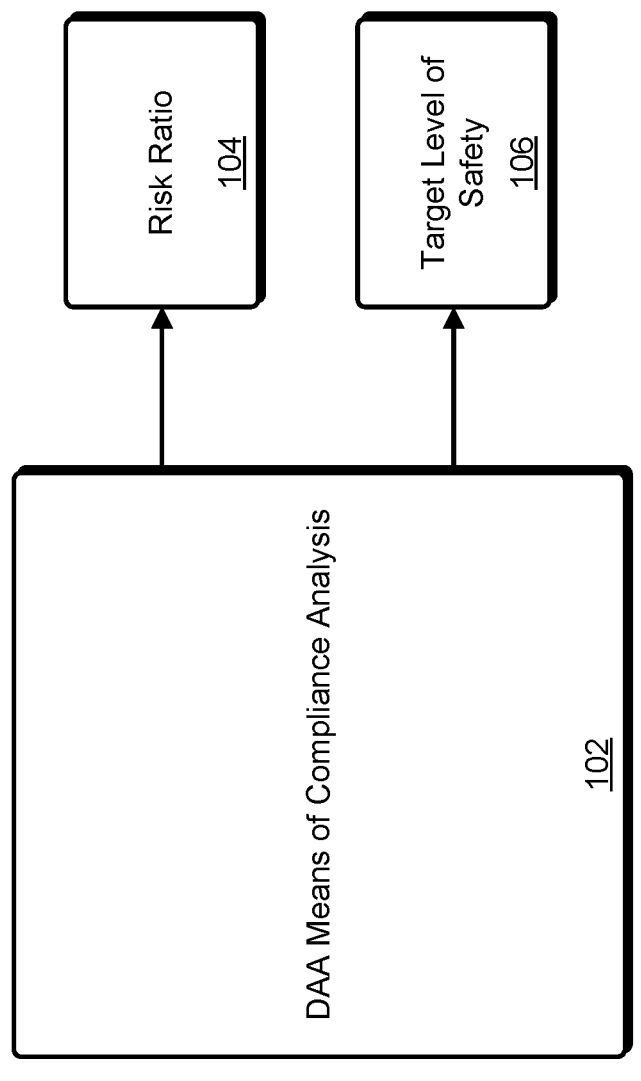
FIG. 1 is a block diagram illustrating a system to analyze detect and avoid (DAA) means of compliance, in accordance with an embodiment.

Techniques and systems described below relate to detect and avoid (DAA) operations of aircraft and compliance analysis thereof.

A key function required for safe operation of an aircraft system in the National Airspace System (NAS) is detect and avoid (DAA), where DAA encompasses the detection and avoidance of both cooperative (aircraft that emit information that can be used by other aircraft to track their location) and non-cooperative (aircraft with no active transponder) air traffic. A DAA system must be capable of replacing an on-board pilot's duty to see and avoid other aircraft as specified in various regulations adopted by governing authorities. Two regulations governing an on-board pilot's duty to see and avoid other aircraft are 14 CFR § 91.111 and 14 CFR § 91.113, which state:

No person may operate an aircraft so close to another aircraft as to create a collision hazard. 14 CFR § 91.111(a).

When weather conditions permit, regardless of whether an operation is conducted under instrument flight rules or visual flight rules, vigilance shall be maintained by each person operating an aircraft so as to see and avoid other aircraft. When a rule of this section gives another aircraft the right-of-way, the pilot shall give way to that aircraft and may not pass over, under, or ahead of it unless well clear. 14 CFR § 91.113(b).

Various groups and standards bodies have proposed requirements for DAA systems aimed at satisfying § 91.111 and § 91.113, as described above, derived from a definition of DAA Well Clear (DWC), a separation standard derived for unmanned aircraft systems (UAS) that serves as an approach for UAS compliance with § 91.111 and § 91.113. Requirements aim to admit a variety of mission types and attempt to be compatible with all sizes of UAS, from small drones to large Part 23 cargo aircraft. Extensive analysis with traffic modeling and Monte Carlo simulation of encounter scenarios has been performed by various institutions to define these requirements.

As described below in conjunction with FIGS. 1-3, a system, comprising instructions that, if executed, analyzes flight systems, sensor data, air traffic simulation data, and/or any other data in order to verify requirements such as those outlined in governmental regulations or by standards bodies as described above. Such a system is to provide a means of compliance (MOC) for regulations through analysis of aircraft, sensor models and/or data, and air traffic models and/or data.

Generalized DAA system and component requirements prevent individual organizations and equipment manufacturers from needing to perform MOC analysis for every mission type and vehicle. However, in order to accommodate a range of mission types and vehicle sizes, the generic requirements that result tend to include significant conservatism when applied to specific vehicles and mission types. To analyze and demonstrate MOC for DAA systems, various systems and approaches may be used such as those described further herein, such as a system comprising a framework that utilizes air traffic flow models combined with sensor models and/or data specific to various aircraft systems to compute metrics usable to determine a MOC.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, especially the field of aircraft systems compliance, by modeling and analyzing specific aircraft system data with respect to air traffic behavioral modeling and modeling of a remote pilot's reactions to determine compliance with various regulations and/or safety standards. Additionally, techniques described and suggested in the present disclosure improve the efficiency of determining compliance of various aircraft systems with regulations and/or safety standards by modeling aircraft systems behavior and performing computational analyses without the need to deploy said aircraft systems or perform physical testing. Moreover, techniques described and suggested in the present disclosure are necessarily rooted in computer technology in order to overcome problems specifically arising with the computing resources required to generate and analyze air traffic and sensor modeling data by generating and storing said data using a computing device.

FIG. 1 is a block diagram illustrating a system to perform a method of detect and avoid (DAA) means of compliance (MOC) analysis 102, in accordance with an embodiment. In an embodiment, a DAA MOC analysis 102 system is a computing system comprising instructions that, if performed by one or more processors of the computing system, cause the computing system to generate one or more data values comprising metrics indicating compliance with or usable to determine compliance with one or more safety rules and/or regulations, such as those described above. Two primary metrics are usable to analyze safety for DAA systems: risk ratio 104 and target level of safety 110. In an embodiment, risk ratio 104 is a data value comprising numerical information representing a conditional probability. A risk ratio 104 is defined as the ratio of the conditional probability of an event occurring with mitigation to the conditional probability of the event occurring without mitigation. A risk ratio 104 attempts to measure the effectiveness of a mitigation, such as DAA mitigation. A risk ratio less than one indicates the system with mitigation is more effective than the system with no mitigation. In at least one embodiment, all analyses performed during DAA MOC analysis 102 is with respect to an ownship, which is the aircraft containing the DAA system under evaluation.

During DAA MOC analysis 102, two risk ratio 104 types may be computed. A first risk ratio 104 data value indicates near mid-air collision (NMAC) probability as:

$$RR_{NMAC} = \frac{P(NMAC \mid \text{encounter with } DAA)}{P(NMAC \mid \text{encounter without } DAA)}$$

A second risk ratio 104 data value indicates loss of DAA well clear (LoDWC) probability as:

$$RR_{LoDWC} = \frac{P(LoDWC \mid \text{encounter with } DAA)}{P(LoDWC \mid \text{encounter without } DAA)}$$

An NMAC occurs when an intruder aircraft enters into a cylinder centered around an aircraft using a DAA system to be analyzed, as described below in conjunction with FIG. 2. That cylinder, in an embodiment, has a 500 ft radius and +/−100 ft height. In another embodiment, that cylinder has any radius and height determined by safety standards and/or regulations. For non-cooperative intruders, LoDWC occurs when the intruder aircraft enters into a cylinder centered around an aircraft that has a 2200 ft radius and +/−450 ft height, in an embodiment. In another embodiment, that cylinder has any radius and height determined by safety standards and/or regulations. For cooperative intruders, LoDWC occurs when the intruder aircraft enters into a cylinder centered around an aircraft that has a 4000 ft radius and +/−450 ft height, in an embodiment. In another embodiment, that cylinder has any radius and height determined by safety standards and/or regulations. With cooperative intruders, an additional data point referred to as modified tau indicates a time to closest approach aspect of LoDWC. LoDWC occurs if either a cylinder is violated or modified tau is less than 35 seconds.

The numerators of the above equations represent a situation where an ownship has a DAA system that attempts to avoid an intruder and the intruder does not maneuver in response to the ownship. The denominators of the above equations represent where neither aircraft, ownship or intruder, performs an avoidance maneuver. Risk ratio 104 data values, such as probabilities, are conditional on an aircraft being in an encounter with another aircraft, where an encounter is defined as having another aircraft within 3 NM laterally and 1000 ft vertically of an ownship aircraft. In another embodiment, that encounter cylinder has any radius and height determined by safety standards and/or regulations. This conditional probability removes any aspect of traffic density from formulation and allows for an analysis and evaluation of an aircraft system based purely on the performance of the candidate aircraft's DAA system.

Target level of safety 106 is data comprising numerical information, in an embodiment. Target level of safety 110 comprises numerical information indicating an absolute probability of some event, such as NMAC, over a given flight plan. This metric traditionally is usable to illustrate or demonstrate that a system meets more traditional safety criteria. In certain circumstances, target level of safety 106 alone does not effectively evaluate DAA system performance. First, it is difficult to properly model the airspace and environment in order to estimate the absolute probability of NMAC. Not only must a DAA system and an aircraft on which it resides be modeled, but traffic density, weather, airspace structure, and effects of air traffic control (ATC) interaction must all be modeled. Further complicating this modeling is spatial and temporal variation of these factors because they all depend on geographic location, season, and time of day. Additionally, no mechanism currently exists to capture the beneficial effect of ATC separation services on airspace interaction in densely populated terminal environments.

Second, target level of safety 106 data has a strong dependence on traffic density. Magnitude of traffic density can change from location to location and can greatly outweigh the impact of DAA system performance. Such a strong dependence on traffic density can result in undesirable conclusions when considering target level of safety by itself. In very low density areas, a vehicle with no DAA system can be shown to meet a target level of safety 106, thereby ignoring the effectiveness of the DAA system altogether. In moderate to high density areas, it can be impossible to meet the target level of safety 106 even with very effective DAA systems that far exceed the capabilities of a human pilot because high traffic density overwhelms target level of safety 106 calculations.

Finally, even when the previous two issues are overcome, the resulting NMAC rate calculation must be compared to some acceptable threshold. This threshold should be a function of the observed NMAC rate in a National Airspace System (NAS). An observed NMAC rate for piloted operations is an average, resulting from the variations in individual flight NMAC rates for each operation driven by the traffic density on the specific route and ATO services provided to a flight. As a result, the NMAC rate for any specific piloted operation could be one or more orders of magnitude higher or lower than an average NMAC rate for a NAS. Since it is not feasible given available data to spatially or temporally decompose this average NMAC rate estimate (i.e. observed NMAC rates for specific areas or times of day cannot be confidently estimated), an operator is forced to compare a specific flight plan NMAC rate to the NAS average. Comparing specific flight plan NMAC rates to the NAS average will result in the target level of safety 106 only being satisfied in areas with low traffic density (due to the strong NMAC rate dependence on traffic density).

Given these issues, the consequence of focusing on a target level of safety 106 in a safety framework to perform DAA MOC analysis 102 is an inability to scale operation outside of extremely low density airspace. Therefore, the target level of safety 106 metric, taken alone, is unable to indicate or be used to analyze 102 an effective long term DAA safety strategy.

A DAA MOC analysis 102 leverages both risk ratio 104 and target level of safety 106. Metric values which may be usable during DAA MOC analysis 102 for satisfying 14 CFR § 91.111 and 14 CFR § 91.113, as described above, are as follows:

| Cooperative Risk Ratios | Non-Cooperative Risk Ratios | Target Level of Safety |
|---|---|---|
| $RR_{NMAC} \le 0.18$ $RR_{LoDWC} \le 0.4$ | $RR_{NMAC} \le 0.3$ $RR_{LoDWC} \le 0.5$ | $P(NMAC) \le 1 \times 10^{-5}$ per flight hour |

A cooperative intruder is one with a transponder that broadcasts a signal that allows for ATC or other aircraft to determine its position. A correlated encounter model uses historical data to capture the behavior of cooperative aircraft during encounters observed in the data. This model has been trained on historical data so that realistic encounters between cooperative aircraft can be generated. This enables the simulation of a large number of encounters that can be used to show DAA system effectiveness, namely risk ratios for NMAC and LoDWC.

Similar to a Correlated Encounter Model for cooperative aircraft, an Uncorrelated Encounter Model generates non-cooperative aircraft trajectories. Non-cooperative encounter simulations are performed using an Uncorrelated Encounter Model to evaluate DAA system effectiveness against non-cooperative intruders.

DAA MOC analysis 102 is usable to show that flight plans meet the requirements of 14 CFR § 91.111 and 14 CFR § 91.113, as described above. This analysis leverages the conditional probabilities computed in the analysis for the risk ratios 104, but the addition of encounter rate estimates allows for computing the absolute NMAC rate.

Figure 2:
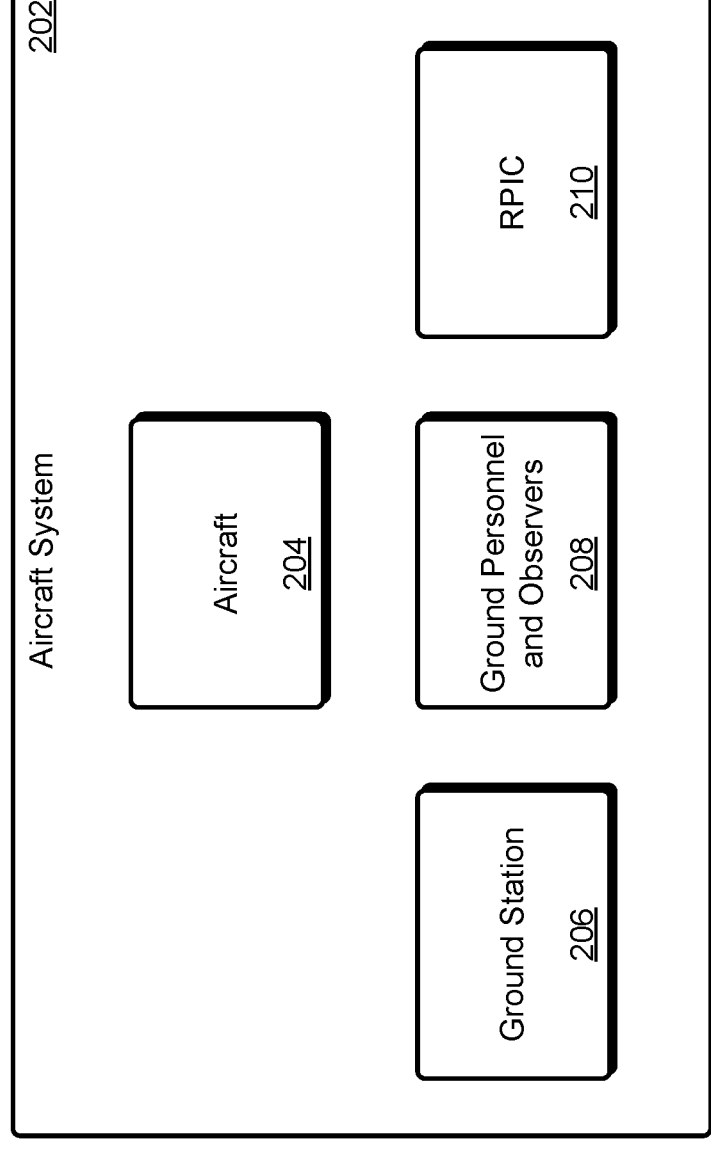
FIG. 2 is a block diagram illustrating an aircraft system to perform DAA, in accordance with an embodiment.

FIG. 2 is a block diagram illustrating an aircraft system 202 to perform detect and avoid (DAA), in accordance with an embodiment. An aircraft system 202 is hardware, software, and/or human components to operate an aircraft 204, in an embodiment. In an embodiment, an aircraft system 202 comprises an aircraft 204, one or more ground stations 206, one or more ground personnel and/or observers 208, and a remote pilot in control (RPIC) 210. In another embodiment, an aircraft system 202 comprises any other components necessary to operate a remotely controlled and/or autonomously controlled aircraft 204. In an embodiment, an aircraft 204 is an airplane. In another embodiment, an aircraft 204 is any other machinery capable of flight. In an embodiment, an aircraft 204 is a remotely operated Cessna 208B aircraft. An aircraft 204, such as a Cessna 208B, is a type certificated aircraft with an extensive service history. An aircraft 204 is retrofitted with a suite of hardware and avionics in support of all automated flight (autoflight) functions. An aircraft system 202 comprises all relevant command and control (C2) and communication interfaces to handle data transfer and voice communication between system components. To support DAA operations, the aircraft system 202 may include a combination of ground station data, such as real-time air traffic data, air-to-air radars, and/or vision systems (EO/IR). The aircraft system 202 further comprises airport-based ground observers 208, which are human and/or machine observers to communicate flight information to an aircraft 204 to perform DAA.

An aircraft system 202, in an embodiment, comprises one or more RPIC 210. An RPIC 210 is a computing system operated by a human, in an embodiment, to manage flight automation. An RPIC 210 approves uploaded trajectories and commands to be executed by aircraft 204 subsystems. An RPIC 210 does not have the ability to directly control the flight surfaces or "hand fly" via stick and rudder. Instead, an RPIC 210 performs operations analogous to operating a single fault tolerant, high-integrity flight management system. System management tasks are delegated to automation to the maximum extent possible, reducing rote procedures to simple confirmation prompts. The RPIC 210 manages ATC communication similarly to a regular manned flight with onboard Very High Frequency (VHF) radios relayed over a bidirectional communications link. The personnel required for aircraft system 202 operation are a cargo loader, airport ground observer 208, and an RPIC 210. All of the aircraft system 202 operations from the engine start to the engine shut-down occur without the need for onboard personnel.

Prior to flight, a ground personnel 208, such as a ground crew, loads relevant cargo onto the aircraft 204 and confirms the weight and balance configuration for the RPIC 210. The RPIC 210 initiates relevant ROAS built-in-tests and communicates with ground personnel prior to engine start. Aircraft system 202 checkouts include a thorough evaluation of the automated flight (autoflight) system and completion of a pilot operating handbook (POH) pre-flight inspection. Prior to departure, the RPIC 210 submits an IFR flight plan to the appropriate ARTCC detailing the intended ground track. The RPIC 210 initiates engine start upon coordination with ground crew. Once all pre-flight activities are complete, the RPIC 210 awaits instruction from ATC and ground handlers to begin ground movement.

Ground observers 208 are humans present at departure and destination airports to provide local ground obstacle and ground traffic separation during taxi and takeoff. All members of the ground crew and remote operation are in instantaneous communication via shared communication links. The RPIC 210 handles all ATC radio communication. If applicable, the RPIC 210 makes announcements and monitors Common Traffic Advisory Frequency (CTAF). After first command and motion, the aircraft taxis along a pre-programmed route to the appropriate runway, and automatically stops prior to any hold-short lines along the way. Positive action, such as input, is required from the RPIC 210 to cross any hold-short lines. Avoidance maneuvers available to the RPIC 210 during the taxi phase are "Pause/Go" commands. The "pause" command halts the vehicle on its path while the "go" command resumes taxi of the pre-programmed route. If ATC issues a reroute, the RPIC 210 updates the route and executes the updated plan. Ground personnel communicate relevant DAA information to the RPIC 210.

Below 1000 feet above ground level (AGL) and within 2 nautical miles (NM) of an airport, ground observers 208 relay relevant DAA information to the RPIC 210. Above 1000 feet AGL, the ground observers 208 transfer DAA responsibility to the RPIC 210. The DAA system on the aircraft 204 may detect other aircraft using a combination of transponder-based inputs and sensors aimed at detecting non-cooperative aircraft. After climbing past 1000 feet AGL, the aircraft expeditiously climbs to 10000 feet mean sea level (MSL), an airspace in which all aircraft are required to have a transponder per regulations 14 CFR § 91.215 and § 91.225.

Upon intruder detection, the aircraft 204 DAA system provides advisory avoidance maneuvers to the RPIC 210. The RPIC 210 alerts ATC via VHF call of the avoidance maneuver; whether this call occurs before or after the maneuver depends on the urgency of the avoidance maneuver suggested. Upon executing the avoidance maneuver, the aircraft will maintain its new course for a predetermined duration before returning to the originally programmed flight plan. On approach, the aircraft 204 follows a flight path in accordance with the selected published instrument approach procedure (IAP). If required, the RPIC 210 may initiate an automated missed approach per the IAP. After landing, the aircraft 204 automatically exits the runway and taxis to a predetermined area, or the RPIC 210 programs in a new route and destination per ATC issuance. Upon arrival at the final destination, the RPIC 210 disables the engine and the autoflight system. Follow-on ground activities are handled by ground personnel.

Figure 3:
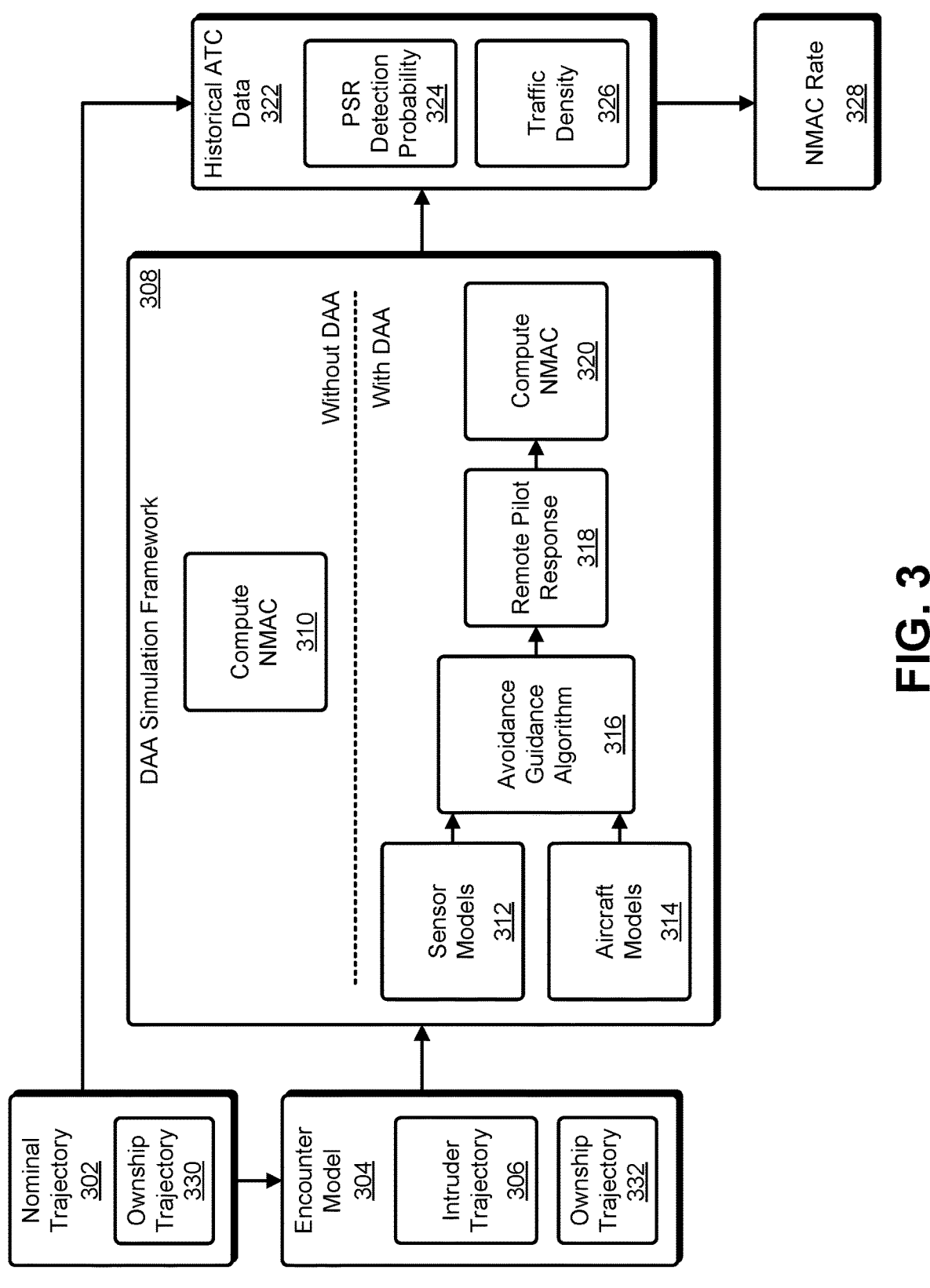
FIG. 3 is a block diagram illustrating a framework to perform means of compliance analysis, in accordance with an embodiment.

FIG. 3 is a block diagram illustrating a simulation framework 308 to perform means of compliance analysis, in accordance with an embodiment. In order to demonstrate that a detect and avoid (DAA) system satisfies the means of compliance described above in conjunction with FIG. 1, a DAA simulation framework 308 analyses data, such as intruder trajectory 306 and sensor model 312 data, and outputs a risk ratio usable to compute an NMAC rate 328.

In an embodiment, a simulation framework 308 is software instructions that, if executed by one or more processors of a computer system, generates one or more metric data values such as a risk ratio, as described above in conjunction with FIG. 1. In an embodiment, a simulation framework 308 leverages open-source tools, such as open-source tools to model encounters 304 from MIT Lincoln Laboratory. In other embodiments, a simulation framework 308 leverages other tools to model encounters 304. In an embodiment, a simulation framework 308 leverages sensor models 312 to generate information about an aircraft system, such as that described above in conjunction with FIG. 2.

A DAA simulation framework 308 utilizes models, such as open source and/or proprietary models 304, 312, to estimate a risk ratio. A risk ratio is computed using the output from the DAA simulation framework 308 according to equations described above in conjunction with FIG. 1. In an embodiment, a DAA simulation framework 308 is built in Matlab/Simulink and is restricted to simulation encounters with non-cooperative traffic. In other embodiments, a DAA simulation framework 308 is built using any other programming language and/or modeling library. In an embodiment, a DAA simulation framework 308 leverages one or more open source software packages, such as DAA Evaluation of Guidance, Alerting and Surveillance (DE-GAS) provided by MIT Lincoln Laboratory. In other embodiments, a DAA simulation framework 308 leverages any other proprietary software packages to facilitate DAA evaluation.

In order to evaluate the effectiveness of any DAA system it is necessary to generate representative trajectories for both an ownship and an intruder aircraft. Intruder paths are unknown and must be generated in a manner that represents the behavior of intruders under a variety of circumstances.

To generate intruder tracks based on intruder behavior, a DAA simulation framework 308 utilizes output from an encounter model 304. In an embodiment, an encounter model 304 is software instructions that, if executed, generate data indicating an intruder trajectory 306. In an embodiment, an intruder trajectory 306 is a path estimated for an intruder aircraft. In an embodiment, an encounter model 304 is an open source model, such as an open source encounter model 304 developed by MIT Lincoln Laboratory to generate intruder trajectories 306 based on factors that influence intruder behavior. Intruder behavior varies with geographic location, altitude and airspace class. Behavior is also influenced by whether or not the intruder has a transponder and is actively transmitting its position to air traffic control as well as other aircraft in its vicinity. Aircraft with transponders are considered "cooperative," and their maneuvers are likely to be influenced by guidance from air traffic control and cooperation with other aircraft. An encounter model 304 models an intruder trajectory 306 using a Correlated Encounter Model to capture the correlated nature of their behavior. Aircraft that do not have transponders are considered "non-cooperative" and are generally more likely to maneuver in a less predictable manner than cooperatives. These "non-cooperative" aircraft trajectories are generated from an Uncorrelated Encounter Model. Both models consist of a Bayesian network that represents relationships between dynamic aircraft variables which can be used to construct random aircraft trajectories that are statistically similar to those observed in the national airspace. Because intruder behavior changes across these layers and representative flight plans traverse multiple altitude layers and airspace classes, risk ratio analysis must account for the amount of time that the ownship spends on average in each altitude layer and airspace class.

A DAA simulation framework 308 uses, as input, a set of nominal trajectories 302 that approximate the aircraft behavior for a given mission. In an embodiment, nominal trajectories 302 are one or more sets of data indicating aircraft trajectories. Nominal trajectories 302 representing ownship trajectories 330 are sampled from a collection of trajectories that represent typical Cessna 208 cargo operations. This set of trajectories is generated by breaking down simulated flight plans into segments representative of short subsets of climb, en-route, or descent flight. Each segment is then weighted by the expected rate of occurrence in nominal operations. For example, climbing, descending, and turning segments are less likely to be drawn in a given encounter than a straight, level segment because most of a given flight plan is spent in en route cruise.

For non-cooperative encounters, an encounter model 304 must be initialized. To initialize an encounter model 304, an intruder aircraft is placed on the surface of an encounter cylinder around the ownship with a radius of 3 nautical miles NM and a height of +/−1000 ft above and below the ownship. The process for placing the intruder is summarized in the following steps: 1—Sample from the Encounter Model Bayesian network until an intruder track is produced which matches the ownship's altitude layer and airspace. 2—Select a random initial heading for the intruder aircraft from a uniform distribution. Rotate the selected intruder track to match this heading at time zero. 3—Calculate the initial velocity vectors of the ownship and the intruder, and determine the initial relative velocity vector by subtracting the ownship velocity from the intruder velocity. Call this vector $v_r$. 4—Compute the surface S that is normal to vectors parallel to $v_r$ which pass through the initial encounter volume. 5—Uniformly select a random point on S and project a vector parallel to $v_r$ from this point through the initial encounter cylinder. 6—The vector from the previous step will penetrate the encounter cylinder at two points. Choose the point that causes the initial velocity vector of the intruder to point to the interior of the initial encounter volume. 7—Situate the intruder track such that it begins at the point determined in the previous step. Situate the ownship track such that it begins in the center of the initial encounter volume.

For cooperative encounters, the correlated encounter model generates both intruder 306 and ownship 330, 332 nominal trajectories 302, and orients them relative to each other with bearing β and approach angle χ. These pairs of ownship/intruder trajectories are sampled from until one is found that matches the desired altitude layer and airspace and has ownship characteristics that reflect the behavior of a Cessna 208b.

A DAA simulation framework 308 comprises various sensor models 312 to generate data representing aircraft sensors for an aircraft system performing DAA, as described above in conjunction with FIG. 2. In an embodiment, sensor models 312 are data and software instructions that, if executed, generate data representing aircraft sensors as described below. These models are used to explore different architecture options or embodiments of an aircraft system performing DAA. In an embodiment, sensor models 312 comprise a model for an airborne radar sensor. The airborne radar sensor is simulated via simple model that injects unbiased, uncorrelated gaussian noise on the range, azimuth, and elevation of the detected intruder at a rate of 1 Hz. All intruders within the radar sensor's 2 km range and field of view were considered to be continuously tracked. All intruders beyond this range or outside the field of view are unobservable to the DAA guidance algorithm 316, described below, and the remote pilot. In an embodiment, a sensor model for airborne radar includes the addition of correlated noise to better represent a tracking algorithm output, sensor mounting offsets, and detection range variability as a function of radar cross-section. In an embodiment, a sensor model for airborne radar generates data representing a 220 degree total field of view for a top view of an aircraft, and an 80 degree total field of view for a side view of an aircraft. In other embodiments, a sensor model for airborne radar generates data representing any other total field of view for both top and side views of an aircraft.

In an embodiment, sensor models 312 comprise a model for an airborne vision system. In an embodiment, the vision system consists of optical cameras. In another embodiment, the vision system consists of any other type of camera. In an embodiment, each camera captures image data with a 4096× 3000 pixel resolution. In another embodiment, each camera captures image data with any other pixel resolution. An airborne vision system comprises a convolutional neural network, in an embodiment, running at 10 Hz. In an embodiment, a sensor model for airborne vision system generates data representing a 150 degree total field of view for a top view of an aircraft, and a 66 degree total field of view for a side view of an aircraft. In other embodiments, a sensor model for airborne vision system generates data representing any other total field of view for both top and side views of an aircraft. Images from airborne vision system cameras are processed by a neural network, which detects and categorizes intruder aircraft. Range is derived based on classification of intruder type and relative size of the intruder in the image. This system is represented in simulation by a probabilistic model which determines the probability of a track based on the pixel size of the intruder. The probability that the system maintains a track increases as the range of the intruder decreases.

In an embodiment, sensor models 312 comprise a model for an automatic dependent surveillance-broadcast (ADS-B). In an embodiment, ADS-B is the primary means of detection for cooperative intruders. Sensor models may, in an embodiment, model "perfect sensing" as a proxy for ADS-B. "Perfect sensing" means the detection range covers the entire encounter volume and the sensor has 4p steradian field of view. In other embodiments, sensor models for ADS-B inject representative position and timing errors to more accurately capture ADS-B performance for cooperative intruders.

In an embodiment, sensor models 312 comprise a model for a primary surveillance radar (PSR). Real-time access to ATC data that includes PSR may be leveraged for use in a DAA system and modeled by sensor models 312 of a DAA simulation framework 308. PSR data can be used either as a primary means of non-cooperative intruder detection or as a supplement to an airborne-based DAA architecture. Whether its use is feasible depends on the probability of PSR detection in the area in which the system operates, the accuracy of the trajectories derived from PSR measurements, and the latency of the data feed to a remote operator. All three of these aspects are addressed by modeling them in sensor models 312 of a DAA simulation framework 308. PSR-derived trajectories do not have altitude estimates associated with them, so an avoidance guidance algorithm 316, as described below, must assume that an intruder that is within close enough lateral proximity to an ownship is always at the altitude of the ownship.

If a real-time air traffic feed that includes PSR is being generated by a sensor model 312 and used by a DAA simulation framework 308, the probability of PSR detection, $P_d$, needs to be characterized. This characterization can be done by using a sufficient amount of historical ATC data. An estimate for $P_d$ can be computed by comparing SSR-only tracks with reinforced tracks (tracks with both PSR and SSR returns) as follows:

$$P_d = 1 - \frac{N_{SSR\ only\ tracks}}{N_{SSR\ only\ tracks} + N_{reinforced\ tracks}}$$

One issue with using only tracks that have SSR returns as a basis for detection probability characterization is that these tracks will be strongly correlated with larger commercial jets that are always cooperative. If one uses this technique for determining PSR detection probability for non-cooperative vehicles, then the analysis will have to be restricted to SSR tracks for aircraft that are representative of the type of aircraft that are typically non-cooperative. Depending on the form of historical ATC data used to characterize PSR detection probability, one could ignore tracks that clearly represent large jets and commercial transport aircraft based on a number of characteristics (airspeed, tail number, altitude, etc).

A DAA simulation framework 308 comprises various aircraft models 314 to generate data representing an aircraft's attitude. In an embodiment, an aircraft model is data and software instructions that, if executed, generate data representing an aircraft's attitude. Trajectories produced by an encounter model 304, such as the Lincoln Laboratory Encounter Model, include East, North, and altitude coordinates vs time. Similarly, the ownship's nominal track is sampled from representative flight plans, but only the East, North and altitude coordinates are used. However, performance of onboard DAA sensors, represented by sensor models 312, is directly dependent on the ownship's attitude and the sensor resulting field of view. Furthermore, when the ownship is issued avoidance commands, it needs to change its trajectory in a manner that models the response of a Cessna 208. Therefore, a simplified aircraft model 314 of the ownship aircraft dynamics that includes attitude is required.

A high fidelity simulation of the aircraft would include full nonlinear equations of motion, including aerodynamic stability derivatives and integration of Euler's rigid-body equations. This level of complexity is not necessary if avoidance maneuvers are assumed slow enough such that the airplane remains in coordinated flight, with its body frame X-axis aligned with its velocity vector. Using these assumptions, the aircraft's body angular rates can be computed based on the current pitch and bank angles as well as the desired vertical acceleration (h) and desired heading rate of change ($\dot{\psi}_{cmd}$).

$$q = \frac{1}{\left( V \cos(\phi)\left( \frac{\ddot{h}}{\cos(\theta)} + 32.2\cos(\theta)\sin^2(\phi) - \dot{V}\tan(\theta) \right) \right)}$$

$$r = 32.2\frac{\sin(\phi)\cos(\theta)}{V}$$

$$p = 20\left( \dot{\psi}_{cmd} - \frac{q\sin(\phi) + r\cos(\phi)}{\cos(\theta)} \right)$$

These angular rates are then integrated over time to generate the intruder's and ownship's Euler angles $\theta$, $\psi$, and $\phi$. Velocity and altitude rate are also integrated to determine the aircraft's position in terms of East, North, and altitude. To ensure that the ownship does not maneuver faster than Reliable's system would command, the following limitations are applied to the ownship's aircraft model: maximum airspeed is 200 knots, minimum airspeed is 60 knots, maximum bank angle is +/−30 degrees, maximum heading rate is +/−3 degrees/second, maximum climb rate is 1500 feet/minute, maximum descent rate is −1500 feet/minute, and maximum angular rate is +/−5 degrees/second.

A DAA simulation framework 308 comprises an avoidance guidance algorithm 316. In an embodiment, an avoidance guidance algorithm is software instructions that, if executed, compute maneuver magnitudes and initiation times for a simulated encounter. In an embodiment, the NASA DAIDALUS (Detect and AvoID Alerting Logic for Unmanned Systems) guidance algorithm is used to compute appropriate maneuver magnitudes and initiation times for each simulated encounter. In another embodiment the Airborne Collision Avoidance System Xu (ACAS Xu) is used as an avoidance guidance algorithm 316. In other embodiments, any other avoidance guidance algorithm may be used. An avoidance guidance algorithm 316 includes logic to determine the well-clear status between two aircraft and computes the predicted time of well-clear violation based on the current aircraft velocity. This information is then used to compute an alert level indicating the urgency of a required avoidance maneuver (if any). The alert levels are determined based on the following criteria:

Proximate Alert—Violation of a 4000 ft radius, 450 ft height cylinder about ownship predicted within the next 180 seconds.

Preventative Alert—Violation of a 3300 ft radius, 750 ft height cylinder about ownship predicted within the next 60 seconds.

Corrective Alert—Violation of a 3300 ft radius, 450 ft height cylinder about ownship predicted within the next 60 seconds.

Warning Alert—Violation of a 3300 ft radius, 450 ft height cylinder about ownship predicted within the next 30 seconds.

An avoidance guidance algorithm also predicts the alert level that would be achieved for a range of maneuvers, referred to as "bands." Bands are computed for ownship heading changes between +/−136 degrees in increments of 1 degree. Bands are also computed for ownship altitude changes between −1500 ft and 1500 ft in increments of 500 ft.

A DAA simulation framework 308 comprises a remote pilot response 318 model. In an embodiment, a remote pilot response 318 model is software instructions that, if executed, compute operations and generate data representing a remote pilot's reaction to a detected intruder. In an embodiment, a remote pilot response 318 model uses a pilot model developed by MIT Lincoln Laboratory. In other embodiments, a remote pilot response 318 model uses any other model to compute operations and generate data representing a remote pilot's reaction to a detected intruder. A remote pilot response 318 model includes C2 transmit and receive delays expected in an aircraft system as described above in conjunction with FIG. 2. A remote pilot response 318 model captures avoidance maneuver decisions when using a DAA display by a RPIC, as described above in conjunction with FIG. 2. A remote pilot response 318 model receives and acts on the alert level and guidance bands data provided by an avoidance guidance algorithm 316 as described above. The remote pilot response 318 model is configured to issue an avoidance maneuver if a corrective or warning alert is active. For each guidance band, an associated alert level is provided indicating the predicted alert level that will result if this suggestion is not heeded. The remote pilot response 318 model is configured to select the guidance which results in the lowest possible alert level. The avoidance maneuver is selected from the guidance bands provided by an avoidance guidance algorithm 316. For heading changes, bands are provided for +/−136 degrees, with each band corresponding to 1 degree of ownship heading change. For altitude changes, bands are provided for ownship altitude changes between −1500 ft and 1500 ft in increments of 500 ft.

In one embodiment, a remote pilot response 318 model consists of the following elements in series:

1—A 2.5 second delay C2 link receive delay (aircraft transmits ownship and intruder information to pilot at remote command center).

2—A pilot reaction time delay drawn from a statistical reaction time distribution.

3—Logic that determines the minimum required horizontal maneuver to achieve the lowest available alert level.

4—Logic that determines the horizontal maneuver magnitude the remote pilot will command relative to the minimum maneuver.

5—A 2.5 second delay C2 link receive delay (remote command center transmits avoidance maneuver to aircraft).

In various other embodiments, a C2 link receive delay and/or any other data or value to be used by a remote pilot response 318 may be any numerical value usable to model a remote pilot response 318.

Upon the initial receipt of a caution alert or higher, the initial pilot reaction time is randomly selected from a set of pilot reaction times. All subsequent pilot reaction times are modeled using a delay sampled from another set of pilot reaction times. For each reaction, the minimum required horizontal maneuver is computed. The remote pilot response 318 model does not issue the minimum required maneuver. Rather, it issues a turn that is on average about 20 degrees more than a minimum required maneuver.

A DAA simulation framework 308 comprises instructions that, if executed, compute and output a probability of an NMAC 310, 320 P(NMAC) as described above in conjunction with FIG. 1. Without DAA, a simulation framework computes an NMAC 310 P(NMAC|encounter without DAA) given data from a nominal trajectory 302 and an encounter model 304, as described above. With DAA, a simulation framework computes an NMAC 320 P(NMAC|encounter with DAA) given data from a nominal trajectory 302 and an encounter model 304, as well as data generated by sensor models 312, aircraft models 314, an avoidance guidance algorithm 316, and a remote pilot response 318 model, as described above. Given both P(NMAC|encounter without DAA) and P(NMAC|encounter with DAA), a risk ratio can be computed as described above in conjunction with FIG. 1.

A DAA simulation framework 308 comprises historical ATC data 322 to generate an NMAC rate $\lambda_{NMAC}$ 328. In an embodiment, historical ATC data 322 is data representing air traffic. In an embodiment, an NMAC rate $\lambda_{NMAC}$ 328 is one or more data values indicating a rate at which an NMAC will occur given a nominal trajectory 302 and data from an encounter model 304 analyzed by a DAA simulation framework 308 to generate a probability for said NMAC P(NMAC). An NMAC rate $\lambda_{NMAC}$ 328 is expressed in terms of an encounter rate and a conditional probability of NMAC given an encounter has occurred as follows:

$$\lambda_{NMAC}=P(\text{NMAC}|\text{enc})\lambda_{enc}$$

The conditional probability, P(NMAC|enc) with DAA, is already being calculated by a DAA simulation framework 308 for each bin (altitude layer and airspace class). In addition to separate probabilities for each encounter model bin, each bin has a separate probability for cooperative and non-cooperative traffic. Therefore, an NMAC rate $\lambda_{NMAC}$ 328 is further expressed as:

$$\lambda_{NMAC}=[P(\text{NMAC}|\text{enc})\lambda_{enc}]_{coop}+[P(\text{NMAC}|\text{enc})\lambda_{enc}]_{non\text{-}coop}$$

To obtain the NMAC rate $\lambda_{NMAC}$ 328 for a specific flight plan, the airspace through which the aircraft flies is discretized into three-dimensional cells. In a given cell i, the NMAC rate $\lambda_{NMAC_i}$ 328 is obtained by multiplying the encounter rate in that cell by the respective cooperative and non-cooperative P(NMAC|enc) with DAA as described above. P(NMAC|enc) for each cell is determined by the bin-type (airspace and altitude layer) that the cell occupies. Then, each NMAC rate $\lambda_{NMAC_i}$ 328 is summed over the cells through which the aircraft flies, where the calculation in each cell is weighted proportionally by the time $t_i$ spent in that cell as follows:

$$\lambda_{NMAC_{flight}} = \sum_{i=1}^{N_{cells}} \lambda_{NMAC_i} \frac{t_i}{t_{flight}}$$

Once the conditional probabilities are obtained from the DAA simulation framework 308, encounter rates are needed to estimate NMAC rate $\lambda_{NMAC}$ 328. In an embodiment, encounter rates are derived from ATC data 322, which is data representing historic air traffic. ATC data 322 comprises traffic density 326, which is data representing air traffic density in cells, as described below. Due to the nature of encounters with cooperative versus non-cooperative aircraft, encounter rate is obtained differently depending on whether the intruder is cooperative or non-cooperative.

Encounters with non-cooperative aircraft can be treated as two aircraft blundering into close proximity. Therefore, non-cooperative encounter rate can be estimated as a function of traffic density 326 and volume swept out by an encounter cylinder as an aircraft traverses its trajectory. To obtain encounter rate, the airspace is discretized into cells that have traffic density $\rho_i$ (aircraft per NM$^3$), which represents the average number of aircraft present in cell i at any instant in time. The encounter rate in each cell is given by $$\lambda_{enc,i}=\rho_i A_i V_i$$

where $A_i$ (NM$^2$) is the projected area of the encounter volume orthogonal to the ownship's average velocity vector in cell i, and $V_i$ (knots) is the average ownship velocity while in cell i.

Traffic density 326 is the major contributor to encounter rate and therefore NMAC rate 328. Traffic density 326, in an embodiment, is estimated from historical traffic data from historical ATC data 322. However, most historical ATC data 322 sources do not include non-cooperative traffic. To account for non-cooperative traffic, a factor of 23% is applied to the cooperative traffic density 326 based on an estimated 23% percent of general aviation traffic being non-cooperative. Different traffic density estimates and/or other data values may be used in various other embodiments.

To characterize traffic density 326 over a given flight plan, the data is first arranged in three dimensions via discrete volumes made up of hexagonal prisms (a volume with a hexagonal base and uniform height). Then, the data is further organized by time to capture traffic behavior during certain times of day. Finally, the data is used to compute an average traffic density 326 in each cell. Since the encounter rate is obtained by integrating the encounter volume over the vehicle trajectory, the hexagonal cells used to discretize the airspace need to be sized such that their dimensions are similar to the dimensions of an encounter cylinder. Large dissimilarities between the cell dimensions and an encounter cylinder result in an inaccurate encounter rate, specifically in the case of where the aircraft traverses a popular airway with concentrated density along the trajectory. If cells are sized much larger than an encounter cylinder, then along popular airways, the concentrated density is spread out across the cell and will result in an underestimate of the actual density. Conversely, if the cells are significantly smaller than an encounter cylinder, then the encounter rate calculation assumes that the density across the entire encounter cylinder is constant and equal to the concentrated density very close to the route. For example, if an airway has traffic density mostly concentrated within one NM of the route and the encounter cylinder is 6 NM wide, then the calculation assumes that the density contained within 1 NM of the route exists across the entire 6 NM wide encounter cylinder.

Cooperative encounter rate cannot be estimated the same way as non-cooperative encounter rate because the cooperative aircraft often do not randomly blunder into one another; rather, they benefit from ATC separation services. Instead of using traffic density and the planned trajectory, cooperative encounter rate is computed from historical tracks. With the same historical data used to characterize traffic density, every flight track in historical ATC data 322 is checked for instances where an aircraft came within 3 NM laterally and 1000 ft vertically of another aircraft. Historical encounters over the entire area of interest can be converted to encounter rate (encounters per flight hour) and discretized into the same hexagonal bins described above. Areas around the airport, where encounters are most common, have sufficient historical data for computing encounter rate. However, in rural areas away from airports, even a large amount of historical data (one year or more) may not yield a sufficient number of encounters to make valid conclusions about cooperative encounter rate. Therefore, in these particular areas, rather than using the historical encounter rate that potentially results in an underestimate, a non-cooperative encounter rate may be used. The use of non-cooperative encounter rates in these areas is conservative as the non-cooperative encounter rate estimate takes no credit for cooperative separation efforts.

Figure 4:
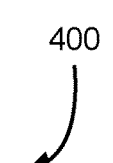
FIG. 4 illustrates a process to perform DAA means of compliance analysis, in accordance with an embodiment.
Figure 4:
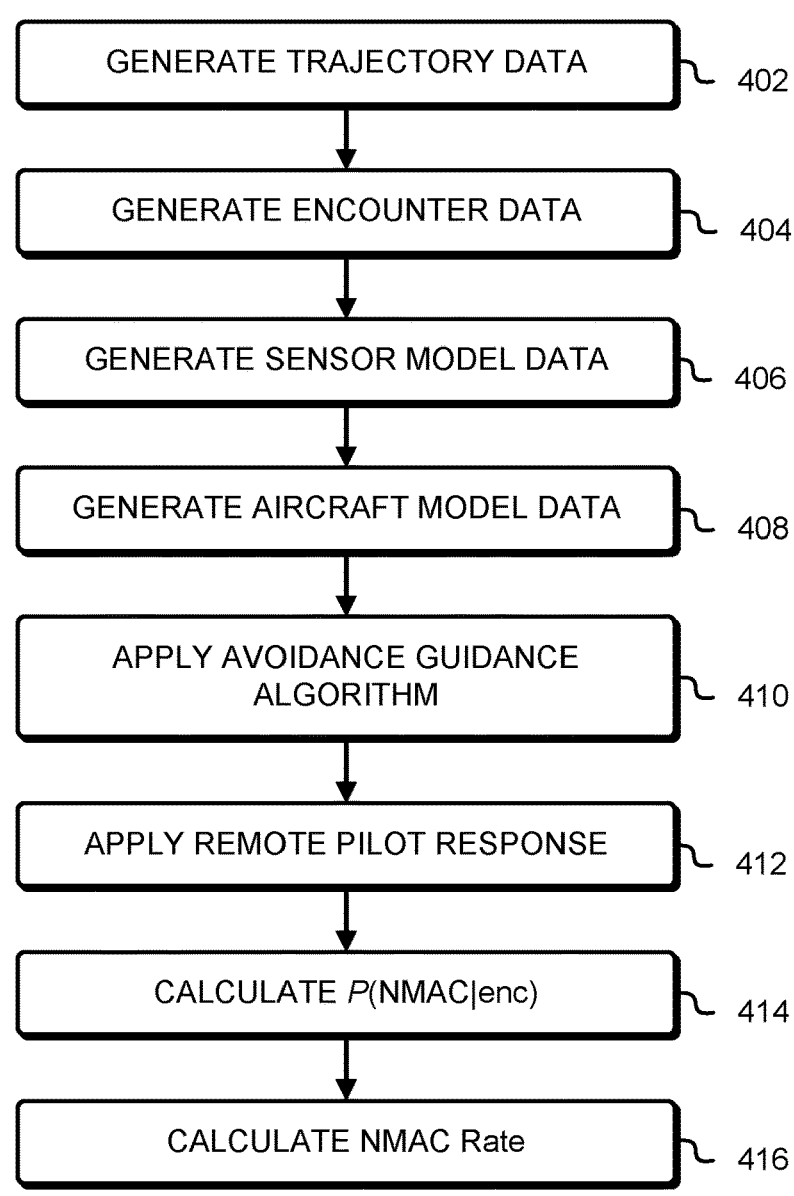

FIG. 4 illustrates a process to perform detect and avoid (DAA) means of compliance analysis using a DAA simulation framework, in accordance with an embodiment. Some or all of the process 400 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 400 may be performed by any suitable system, such as the computing device 500 of FIG. 5. The process 400 includes a series of operations wherein a near mid-air collision (NMAC) rate is calculated using a DAA simulation framework as described above in conjunction with FIG. 3.

At 402, a DAA simulation framework generates aircraft trajectory data, as described above in conjunction with FIG. 3. This trajectory data represents ownship trajectories, and in an embodiment may be sampled from a collection of trajectories that represent typical Cessna 208 cargo operations or operations of any other aircraft. At 404, using an encounter model such as that provided by MIT Lincoln Laboratories or any other encounter model, a DAA simulation framework generates encounter data, as described above in conjunction with FIG. 3. At 406, a DAA simulation framework generates sensor model data, such as data representing such sensors as described above in conjunction with FIG. 3 or any other aircraft sensor. At 408, a DAA simulation framework generates aircraft model data, such as data representing an aircraft's attitude as described above in conjunction with FIG. 3 or any other data representing objects of an aircraft system described in conjunction with FIG. 2 usable to calculate a probability of near mid-air collision (NMAC). At 410, using data generated representing trajectory 402, encounter 404, sensors 406, and aircraft 408, a DAA simulation framework applies one or more avoidance guidance algorithms as described above in conjunction with FIG. 3. Given actions generated by an avoidance guidance algorithm 410, at 412 a DAA simulation framework applies a remote pilot response according to steps described above in conjunction with FIG. 3.

Given data generated by a DAA simulation framework using a remote pilot response 412 model, said DAA simulation framework calculates, at 414, one or more probabilities of NMAC and/or Loss of Distance Well Clear (LoDWC), such as a probability of NMAC/LoDWC with and without DAA for a given set of generated trajectory data 402 and encounter data 404, as described above in conjunction with FIG. 3. Using probability data calculated at 414 in conjunction with historical air traffic control (ATC) data, a DAA simulation framework at 416 calculates an NMAC rate, as described above in conjunction with FIG. 3. Given an NMAC rate calculated at 416 and NMAC probabilities calculated at 414, a DAA simulation framework can demonstrate means of compliance with one or more safety rules or regulations, as described above in conjunction with FIG. 1. Note that, in an embodiment, one or more of the operations performed in 402-420 may be performed in various orders and combinations, including in parallel.

In the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

Figure 5:
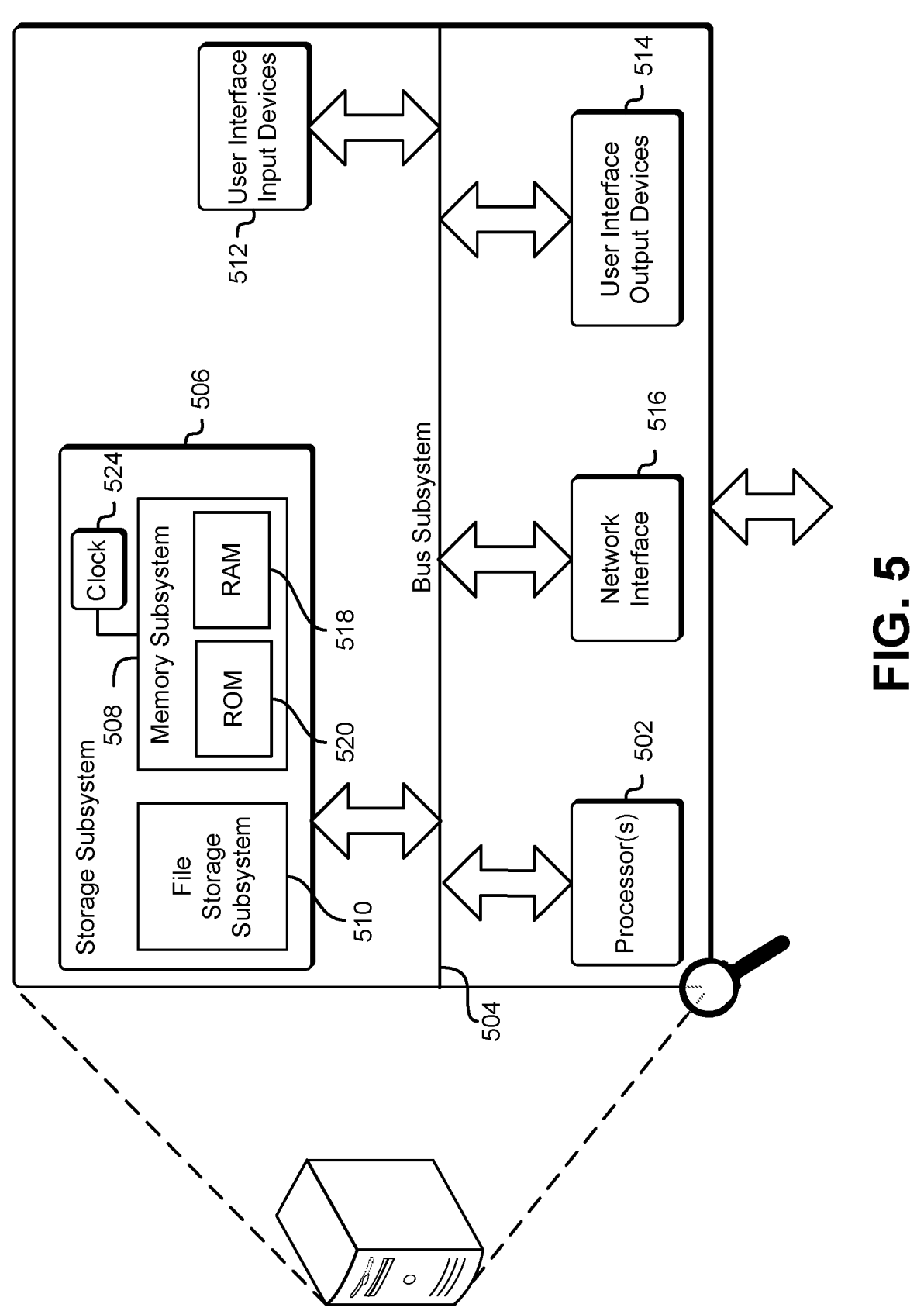
FIG. 5 illustrates a computing device that may be used in accordance with at least one embodiment.

FIG. 5 is an illustrative, simplified block diagram of a computing device 500 that can be used to practice at least one embodiment of the present disclosure. In various embodiments, the computing device 500 includes any appropriate device operable to send and/or receive requests, messages, or information over an appropriate network and convey information back to a user of the device. The computing device 500 may be used to implement any of the systems illustrated and described above. For example, the computing device 500 may be configured for use as a data server, a web server, a portable computing device, a personal computer, a cellular or other mobile phone, a handheld messaging device, a laptop computer, a tablet computer, a set-top box, a personal data assistant, an embedded computer system, an electronic book reader, or any electronic computing device. The computing device 500 may be implemented as a hardware device, a virtual computer system, or one or more programming modules executed on a computer system, and/or as another device configured with hardware and/or software to receive and respond to communications (e.g., web service application programming interface (API) requests) over a network.

As shown in FIG. 5, the computing device 500 may include one or more processors 502 that, in embodiments, communicate with and are operatively coupled to a number of peripheral subsystems via a bus subsystem. In some embodiments, these peripheral subsystems include a storage subsystem 506, comprising a memory subsystem 508 and a file/disk storage subsystem 510, one or more user interface input devices 512, one or more user interface output devices 514, and a network interface subsystem 516. Such storage subsystem 506 may be used for temporary or long-term storage of information.

In some embodiments, the bus subsystem 504 may provide a mechanism for enabling the various components and subsystems of computing device 500 to communicate with each other as intended. Although the bus subsystem 504 is shown schematically as a single bus, alternative embodiments of the bus subsystem utilize multiple buses. The network interface subsystem 516 may provide an interface to other computing devices and networks. The network interface subsystem 516 may serve as an interface for receiving data from and transmitting data to other systems from the computing device 500. In some embodiments, the bus subsystem 504 is utilized for communicating data such as details, search terms, and so on. In an embodiment, the network interface subsystem 516 may communicate via any appropriate network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols.

The network, in an embodiment, is a local area network, a wide-area network, a virtual private network, the Internet, an intranet, an extranet, a public switched telephone network, a cellular network, an infrared network, a wireless network, a satellite network, or any other such network and/or combination thereof, and components used for such a system may depend at least in part upon the type of network and/or system selected. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering. Many protocols and components for communicating via such a network are well known and will not be discussed in detail. In an embodiment, communication via the network interface subsystem 516 is enabled by wired and/or wireless connections and combinations thereof.

In some embodiments, the user interface input devices 512 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 500. In some embodiments, the one or more user interface output devices 514 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 500. The one or more user interface output devices 514 can be used, for example, to present user interfaces to facilitate user interaction with applications performing processes described and variations therein, when such interaction may be appropriate.

In some embodiments, the storage subsystem 506 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 506. These application modules or instructions can be executed by the one or more processors 502. In various embodiments, the storage subsystem 506 additionally provides a repository for storing data used in accordance with the present disclosure. In some embodiments, the storage subsystem 506 comprises a memory subsystem 508 and a file/disk storage subsystem 510.

In embodiments, the memory subsystem 508 includes a number of memories, such as a main random access memory (RAM) 518 for storage of instructions and data during program execution and/or a read only memory (ROM) 520, in which fixed instructions can be stored. In some embodiments, the file/disk storage subsystem 510 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 500 includes at least one local clock 524. The at least one local clock 524, in some embodiments, is a counter that represents the number of ticks that have transpired from a particular starting date and, in some embodiments, is located integrally within the computing device 500. In various embodiments, the at least one local clock 524 is used to synchronize data transfers in the processors for the computing device 500 and the subsystems included therein at specific clock pulses and can be used to coordinate synchronous operations between the computing device 500 and other systems in a data center. In another embodiment, the local clock is a programmable interval timer.

The computing device 500 could be of any of a variety of types, including a portable computer device, tablet computer, a workstation, or any other device described below. Additionally, the computing device 500 can include another device that, in some embodiments, can be connected to the computing device 500 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 500 for processing. Due to the ever-changing nature of computers and networks, the description of the computing device 500 depicted in FIG. 5 is intended only as a specific example for purposes of illustrating the preferred embodiment of the device. Many other configurations having more or fewer components than the system depicted in FIG. 5 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

In some embodiments, data may be stored in a data store (not depicted). In some examples, a "data store" refers to any device or combination of devices capable of storing, accessing, and retrieving data, which may include any combination and number of data servers, databases, data storage devices, and data storage media, in any standard, distributed, virtual, or clustered system. A data store, in an embodiment, communicates with block-level and/or object level interfaces. The computing device 500 may include any appropriate hardware, software and firmware for integrating with a data store as needed to execute aspects of one or more applications for the computing device 500 to handle some or all of the data access and business logic for the one or more applications. The data store, in an embodiment, includes several separate data tables, databases, data documents, dynamic data storage schemes, and/or other data storage mechanisms and media for storing data relating to a particular aspect of the present disclosure. In an embodiment, the computing device 500 includes a variety of data stores and other memory and storage media as discussed above. These can reside in a variety of locations, such as on a storage medium local to (and/or resident in) one or more of the computers or remote from any or all of the computers across a network. In an embodiment, the information resides in a storage-area network (SAN) familiar to those skilled in the art, and, similarly, any necessary files for performing the functions attributed to the computers, servers or other network devices are stored locally and/or remotely, as appropriate.

In an embodiment, the computing device 500 may provide access to content including, but not limited to, text, graphics, audio, video, and/or other content that is provided to a user in the form of HyperText Markup Language (HTML), Extensible Markup Language (XML), JavaScript, Cascading Style Sheets (CSS), JavaScript Object Notation (JSON), and/or another appropriate language. The computing device 500 may provide the content in one or more forms including, but not limited to, forms that are perceptible to the user audibly, visually, and/or through other senses. The handling of requests and responses, as well as the delivery of content, in an embodiment, is handled by the computing device 500 using PHP: Hypertext Preprocessor (PHP), Python, Ruby, Perl, Java, HTML, XML, JSON, and/or another appropriate language in this example. In an embodiment, operations described as being performed by a single device are performed collectively by multiple devices that form a distributed and/or virtual system.

In an embodiment, the computing device 500 typically will include an operating system that provides executable program instructions for the general administration and operation of the computing device 500 and includes a computer-readable storage medium (e.g., a hard disk, random access memory (RAM), read only memory (ROM), etc.) storing instructions that if executed (e.g., as a result of being executed) by a processor of the computing device 500 cause or otherwise allow the computing device 500 to perform its intended functions (e.g., the functions are performed as a result of one or more processors of the computing device 500 executing instructions stored on a computer-readable storage medium).

In an embodiment, the computing device 500 operates as a web server that runs one or more of a variety of server or mid-tier applications, including Hypertext Transfer Protocol (HTTP) servers, FTP servers, Common Gateway Interface (CGI) servers, data servers, Java servers, Apache servers, and business application servers. In an embodiment, computing device 500 is also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python, or TCL, as well as combinations thereof. In an embodiment, the computing device 500 is capable of storing, retrieving, and accessing structured or unstructured data. In an embodiment, computing device 500 additionally or alternatively implements a database, such as one of those commercially available from Oracle®, Microsoft®, Sybase®, and IBM® as well as open-source servers such as MySQL, Postgres, SQLite, MongoDB. In an embodiment, the database includes table-based servers, document-based servers, unstructured servers, relational servers, non-relational servers, or combinations of these and/or other database servers.

At least one embodiment of the disclosure can be described in view of the following clauses:

1. A method comprising:
   receiving a first set of data comprising aircraft information;
   generating a second set of data based, at least in part, on information from one or more sensor models;
   generating a third set of data by applying one or more avoidance algorithms to the first and second sets of data;
   generating a fourth set of data by calculating a remote pilot response based, at least in part, on the third set of data; and
   computing, based at least in part on historical air traffic data and the fourth set of data, two or more metrics usable to measure compliance of a system with one or more rules.
2. The method of clause 1, wherein the aircraft information comprises trajectory data.
3. The method of clauses 1 or 2, wherein the aircraft information comprises encounter data.
4. The method of any of clauses 1-3, wherein the aircraft information comprises data generated by one or more aircraft models.
5. The method of any of clauses 1-4, wherein the one or more sensor models are to generate data comprising information about one or more onboard aircraft sensors.
6. The method of any of clauses 1-5, wherein the third set of data comprises alert level and guidance band data usable to indicate a well-clear status between two or more aircraft.
7. The method of any of clauses 1-6, wherein the fourth set of data comprises information indicating aircraft maneuver guidance.
8. The method of any of clauses 1-7, wherein the two or more metrics comprise at least a metric to indicate a probability of a near mid-air collision (NMAC).
9. The method of any of clauses 1-8, wherein the two or more metrics comprise at least a metric to indicate a loss of detect-and-avoid (DAA) well clear (LoDWC) probability.
10. The method of any of clauses 1-9, wherein the one or more rules are to indicate one or more constraints of detect-and-avoid (DAA) safety requirements.
11. The method of any of clauses 1-10, further comprising computing a risk ratio based, at least in part, on at least one of the two or more metrics.
12. A machine-readable medium having stored thereon a set of instructions, which if performed by one or more processors, cause the one or more processors to at least:

compute a metric usable to determine compliance of a detect-and-avoid (DAA) system with one or more rules based, at least in part, on sensor data generated by one or more aircraft sensor models in response to intruder tracks generated based, at least in part, on encounter models.

13. The machine-readable medium of clause 12, further comprising instructions which, if performed by the one or more processors, cause the one or more processors to determine compliance by computing a risk ratio based, at least in part, on the metric.

14. The machine-readable medium of clauses 12 or 13, wherein the metric is to indicate a probability of a near mid-air collision (NMAC).

15. The machine-readable medium of any of clauses 12-14, further comprising instructions which, if performed by the one or more processors, cause the one or more processors to compute the metric based, at least in part, on the sensor data as well as data indicating one or more trajectories, one or more encounters, and one or more aspects of an aircraft.

16. The machine-readable medium of any of clauses 12-15, further comprising instructions which, if performed by the one or more processors, cause the one or more processors to compute a second metric indicating a loss of DAA well clear (LoDWC) probability.

17. The machine-readable medium of any of clauses 12-16, wherein the one or more rules are to indicate DAA safety requirements.

18. A system comprising:

one or more processors;

memory that stores computer-executable instructions that are executable to cause the one or more processors to:

receive a first data indicating trajectory information;

receive a second data indicating encounter information;

generate a third data based, at least in part, on data generated by one or more aircraft models;

generate a fourth data based, at least in part, on data generated by one or more sensor models; and calculate one or more metrics indicating compliance with one or more detect-and-avoid (DAA) safety requirements based, at least in part, on the first data, the second data, the third data, and the fourth data.

19. The system of clause 18, wherein the data generated by the one or more sensor models comprises information about one or more onboard aircraft sensors.

20. The system of clauses 18 or 19, wherein the one or more metrics comprise at least a metric indicating a probability of near mid-air collision (NMAC) usable to calculate a risk ratio to indicate compliance with the one or more DAA safety requirements.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable or otherwise machine-readable storage medium, for example, in form of a computer program comprising a plurality of instructions executable by one or more processors. In at least one embodiment, a computer-readable or otherwise machine-readable storage medium is a non-transitory computer-readable or otherwise machine-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable or otherwise machine-readable storage media having stored thereon executable instructions (or other memory to store executable instructions) that, when executed (i.e., as a result of being executed) by one or more processors of a computer system, cause computer system to perform operations described herein. A set of non-transitory computer-readable or otherwise machine-readable storage media, in at least one embodiment, comprises multiple non-transitory computer-readable or otherwise machine-readable storage media and one or more of individual non-transitory storage media of multiple non-transitory computer-readable or otherwise machine-readable storage media lack all of code while multiple non-transitory computer-readable or otherwise machine-readable storage media collectively store all of code. In at least one embodiment, executable instructions are executed such that different instructions are executed by different processors—for example, a non-transitory computer-readable or otherwise machine-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that the distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

In present document, references may be made to obtaining, acquiring, receiving, or inputting analog or digital data into a subsystem, computer system, or computer-implemented machine. A process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

What is claimed is:

1. A method, comprising:

receiving a first set of data generated based, at least in part, on relationships between dynamic aircraft variables;

generating a second set of data based, at least in part, on information simulated by one or more sensor models;

generating a third set of data by applying one or more avoidance algorithms to the first and second sets of data;

generating a fourth set of data by simulating a remote pilot response based, at least in part, on the third set of data;

computing, based, at least in part, on the fourth set of data, two or more metrics that are to indicate, if less than or equal to respective threshold values, varying degrees of compliance of an aircraft system, corresponding to the dynamic aircraft variables, with one or more collision avoidance rules, wherein the two or more metrics comprise a risk ratio representing a ratio of a conditional probability of an event occurring with mitigation to a conditional probability of the event occurring without mitigation; and in response to the two or more metrics being greater than the respective threshold values, transmitting instructions that are to cause the aircraft system to perform detect and avoid (DAA).

2. The method of claim 1, wherein the first set of data comprises trajectory data.

3. The method of claim 1, wherein the first set of data comprises encounter data.

4. The method of claim 1, wherein the first set of data comprises data generated by one or more aircraft models.

5. The method of claim 1, wherein the one or more sensor models are to generate data comprising information about one or more onboard aircraft sensors.

6. The method of claim 1, wherein the third set of data comprises alert level and guidance band data usable to indicate a well-clear status between two or more aircraft.

7. The method of claim 1, wherein the fourth set of data comprises information indicating aircraft maneuver guidance.

8. The method of claim 1, wherein the two or more metrics comprise a metric to indicate a probability of a near mid-air collision (NMAC).

9. The method of claim 1, wherein the two or more metrics comprise a metric to indicate a loss of DAA well clear (LoDWC) probability.

10. The method of claim 1, wherein the one or more collision avoidance rules are to indicate one or more constraints of DAA safety requirements.

11. The method of claim 1, wherein:

the two or more metrics are further computed based, at least in part, on historical air traffic data.

12. A non-transitory machine-readable storage medium having stored thereon a set of instructions which, if performed by one or more processors, cause the one or more processors to at least:

compute two or more metrics that are to indicate, if less than or equal to respective threshold values, varying degrees of compliance of an aircraft's detect-and-avoid (DAA) system with one or more collision avoidance rules based, at least in part, on sensor data simulated by one or more aircraft sensor models in response to intruder tracks generated based, at least in part, on encounter models using relationships between dynamic aircraft variables, the dynamic aircraft variables at least corresponding to the aircraft, wherein the two or more metrics comprise a risk ratio representing a ratio of a conditional probability of an event occurring with mitigation to a conditional probability of the event occurring without mitigation; and in response to the two or more metrics being greater than the respective threshold values, transmit instructions that are to cause the aircraft to use the DAA system to perform DAA.

13. The non-transitory machine-readable storage medium of claim 12, wherein the instructions which, if performed by the one or more processors, cause the one or more processors to compute the two or more metrics comprise instructions which, if performed by the one or more processors, cause the one or more processors to compute two risk ratio types.

14. The non-transitory machine-readable storage medium of claim 12, wherein at least one metric of the two or more metrics is to indicate a probability of a near mid-air collision (NMAC).

15. The non-transitory machine-readable storage medium of claim 12, further comprising instructions which, if performed by the one or more processors, cause the one or more processors to compute the two or more metrics based, at least in part, on the sensor data as well as data indicating one or more trajectories, one or more encounters, and one or more aspects of the aircraft.

16. The non-transitory machine-readable storage medium of claim 12, wherein at least one metric of the two or more metrics is to indicate a loss of DAA well clear (LoDWC) probability.

17. The non-transitory machine-readable storage medium of claim 12, wherein the one or more collision avoidance rules are to indicate DAA safety requirements.

18. A system, comprising:

one or more processors; and memory that stores computer-executable instructions that are executable to cause the one or more processors to:

receive first data indicating trajectory information;

receive second data indicating encounter information from relationships between dynamic aircraft variables;

generate third data based, at least in part, on data simulated by one or more aircraft models;

generate fourth data based, at least in part, on data simulated by one or more sensor models;

calculate two or more metrics that are to indicate, if less than or equal to respective threshold values, compliance of an aircraft system, corresponding to the dynamic aircraft variables, with one or more detect-and-avoid (DAA) safety requirements based, at least in part, on the first data, the second data, the third data, and the fourth data, wherein the two or more metrics comprise a risk ratio representing a ratio of a conditional probability of an event occurring with mitigation to a conditional probability of the event occurring without mitigation; and in response to the two or more metrics being greater than the respective threshold values, transmit instructions that are to cause the aircraft system to perform DAA.

19. The system of claim 18, wherein the data simulated by the one or more sensor models comprises information about one or more onboard aircraft sensors.

20. The system of claim 18, wherein the two or more metrics comprise a metric indicating a probability of near mid-air collision (NMAC).

* * * * *